US006832885B2

(12) United States Patent
Sanders et al.

(10) Patent No.: US 6,832,885 B2
(45) Date of Patent: Dec. 21, 2004

(54) HANDLING APPARATUS FOR STRUCTURAL MEMBERS

(75) Inventors: Daniel G. Sanders, Sumner, WA (US); Mark T. Schergen, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 10/234,992

(22) Filed: Sep. 4, 2002

(65) Prior Publication Data

US 2004/0042889 A1 Mar. 4, 2004

(51) Int. Cl.[7] .............................................. B66C 23/00
(52) U.S. Cl. ........................ 414/744.6; 198/750.11; 294/115
(58) Field of Search .......................... 414/744.6, 591; 198/468.2, 750.11, 952; 294/115, 87.51, 67.31; 212/225, 228, 341; 901/15

(56) References Cited

U.S. PATENT DOCUMENTS

| 2,535,961 A | * | 12/1950 | Schutt ................ 212/341 X |
| 2,796,178 A | | 6/1957 | Praschak |
| 4,416,577 A | * | 11/1983 | Inaba et al. ............. 901/30 |
| 4,609,323 A | | 9/1986 | Blaseck et al. |
| 5,087,169 A | | 2/1992 | Tübke |
| 5,088,610 A | | 2/1992 | Garnier |
| 5,292,221 A | | 3/1994 | Fenander |
| 5,338,150 A | * | 8/1994 | Focke et al. .......... 294/115 X |
| 5,372,469 A | | 12/1994 | Kobayashi |
| 5,440,943 A | | 8/1995 | Holt et al. |
| 5,908,122 A | * | 6/1999 | Robinett et al. .......... 212/225 |
| 5,909,997 A | | 6/1999 | Liljengren et al. |
| 6,039,375 A | | 3/2000 | Bauman |
| 6,499,777 B1 | * | 12/2002 | Wang .................... 294/1.1 |

FOREIGN PATENT DOCUMENTS

| DE | 91 318 A | 7/1972 |
| DE | 27 42 163 A1 | 3/1979 |
| DE | 3237641 A1 | 4/1984 |
| FR | 2 595 087 A | 9/1987 |

OTHER PUBLICATIONS

Declarations of Daniel G. Sanders dated Nov. 5, 2002 and Mark Schergen dated Nov. 7, 2002 relating to Part Loader sold by The Boeing Company to Pratt & Whitney in Apr., 1994; 3 pgs.
Hanes Supply, Inc.; "Bridges/Cranes/Manipulators" and "Manipulators/Movers/Lifts"; catalog; pp. 15–7 and 15–8; also available at http://www.hanessupply.com/catalog/015/015–0007.html and http://www.hanessupply.com/catalog/015/015–0008.html.

* cited by examiner

*Primary Examiner*—Donald W. Underwood
(74) *Attorney, Agent, or Firm*—Alston & Bird LLP (57) ABSTRACT

There is provided an apparatus for handling a structural member. The apparatus includes a beam that extends from a first end to a second end and a shuttle in translational communication with the beam in a direction extending between the first and second ends. A fork actuator is connected to the shuttle and capable of hydraulically raising and lowering a fork. The fork can include a cooling system to maintain a temperature of the fork, even when used in a heated environment.

31 Claims, 8 Drawing Sheets

HANDLING APPARATUS FOR STRUCTURAL MEMBERS

BACKGROUND OF THE INVENTION

1) Field of the Invention

The present invention relates to an apparatus for handling structural members and, more particularly, relates to an apparatus for releasably engaging and moving structural members into and out of a processing device such as a superplastic forming hot press.

2) Description of Related Art

The manufacture of a structural member often includes forming and treating the structural member in a number of different processing devices, each requiring the structural member to be lifted and loaded into the device and subsequently lifted and unloaded from the device. Often such handling of the structural member is performed at least partially by an operator. For example, an operator might load an unprocessed structural member into a processing device by lifting the structural member from a stack of available structural members that are waiting to be processed, loading a structural member onto a processing platform such as a die, and aligning the structural member with one or more guides on the platform. Repeated loading in this fashion can be fatiguing to the operator, especially if the structural members are heavy, large, or otherwise difficult to handle. For example, structural members formed in a superplastic forming hot press can weigh 150 pounds or more and can be several feet long and several feet wide. In order to load and unload the structural member horizontally on the processing platform, the operator must lean over the structural member, further increasing the difficulty loading and unloading and further increasing fatigue.

The handling of the structural member is made more difficult if human contact with the structural member is undesirable. If the structural member is hot, sharp, toxic, or otherwise dangerous, the operator may be required to wear protective gear while handling the structural member and/or limit the duration of interaction with the structural member. For example, structural members formed in a superplastic forming hot press may be heated to temperatures exceeding 1700° F. for forming. The structural members may be preheated before loading into the press and can emerge from a press at temperatures as high as the forming temperature. Operators that load and unload structural members directly into and out of such a hot press must wear temperature protective clothing, which often is uncomfortable, limits the manual dexterity of an operator, and inhibits the operator's vision and other senses. Additionally, an operator may be required to use special handling techniques to limit exposure to the heat from the structural members and the press. For example, lifting the structural member from the press may require an operator to quickly lean over the press, grasp the structural member, lift the structural member, move to a cooling area, and lower the structural member. The operator must work quickly to avoid excessive heat exposure.

Alternatively, an operator can use a lifting mechanism, such as an overhead crane or winch to provide the lifting force necessary to load the structural member. In that case, the operator attaches the crane to the unprocessed structural member, for example, by using hooks to connect a cable between the structural member and the crane. The operator then uses the crane to lift the structural member and hold the structural member in an elevated position while the operator then grasps the structural member and moves it to a position above the processing platform. The operator then lowers the structural member with the crane, removes the hooks from the structural member, and adjusts the placement of the structural member to align the structural member relative to the processing platform. The crane reduces the lifting stress on the operator, but still requires the operator to work near the hot structural member to connect the structural member to the crane, move the structural member, disconnect the structural member from the crane, and adjust the alignment of the structural member.

One device that has been proposed for handling structural members includes a scissoring linkage that can be extended and retracted vertically by a pneumatic actuator. The scissoring linkage is supported from above such that extension and retraction of the linkage raises and lowers a fork. The fork is connected to the structural member using a long rod that is threaded horizontally through at least one aperture on each of the fork and the structural member. Similar to the crane described above, the pneumatic actuator provides the lifting force for loading and unloading the structural member. However, the operator must still work near the structural member and the processing device to connect and disconnect the fork and the structural member and to move the structural member to and from the platform. Also, threading the long rod through the fork and structural member requires the various apertures to be closely aligned. Threading is made difficult if the structural member or the fork is out of alignment, for example, due to deflection of one or more components or incorrect placement of the scissoring linkage by the actuator. One or more operators may be required to manually push the fork and/or structural member into alignment. Additionally, because the pneumatic actuator is not capable of precise placement of the structural member, the operator must manually assist the placement of the structural member on the processing platform so that it is not damaged during placement and manually align the structural member relative to the processing platform. The operator is at significant risk of fatigue.

Thus, there exists a need for an apparatus for handling a structural member. The apparatus should be capable of lifting, moving, and manipulating structural members without requiring significant physical exertion on the part of the operator. The apparatus should also be capable of engaging and precisely placing the structural member without requiring the operator to work close to the structural member or the processing device, thus reducing the operator's exposure to heat and/or other dangers. Preferably, the apparatus should be compatible with different structural members.

BRIEF SUMMARY OF THE INVENTION

The present invention provides an apparatus for handling structural members. According to one embodiment of the present invention, the apparatus includes a beam extending from a first end to a second end, a shuttle in translational communication with the beam in a direction extending between the first and second ends, a fork actuator connected to the shuttle, and a fork connected to the fork actuator.

According to one aspect of the present invention, the beam is rotatable about a vertical axis. For example, the beam can be cantilevered from a hinge. A beam actuator can communicate with the beam and rotate the beam about the vertical axis.

According to another aspect of the invention, a plurality of wheels are rotatably connected to the shuttle and in rolling contact with the beam to translatably engage the beam to the shuttle so that the shuttle can be translated along at least a part of the beam, for example, by a shuttle actuator. The beam can define a rack gear extending between the first and second ends of the beam and each wheel of the shuttle can define teeth that engage the rack gear.

The fork actuator has a first portion and a second portion, which can be hydraulically raised and lowered. The fork is connected to the second portion so that the fork is raised and lowered therewith. According to one aspect of the invention, an extension lock engages the fork to the first portion of the fork actuator and thereby prevents extension of the fork. A rotational actuator such as a variable speed electric motor can rotate the fork actuator relative to the beam.

According to yet another embodiment of the present invention, the fork has a first end and a second end. The first end is connected to the fork actuator and the second end extends outwardly from the fork actuator such that the second end is capable of extending outwardly into a heating chamber to engage the structural member. The fork can also include a latch linkage, a latch actuator capable of adjusting said latch linkage, and at least one latch member. The latch linkage is adjustable to releasably engage the latch members with the structural member. For example, the latch linkage can include one or more pushrods that slidably engage the fork and latch members such as latches that are rotatably connected to the fork and the pushrods. Translation of each pushrod causes a respective latch to engage and disengage the structural member.

According to still another embodiment of the invention, the fork includes a cooling system such as passages for circulating a coolant. The passages can extend between the first and second ends of the fork and can be fluidly connected to a coolant source. Additionally, the apparatus can include a duct connected to the fork and configured to emit a cooling fluid directed toward the structural member when the fork is engaged to the structural member.

The present invention also provides an apparatus for releasably engaging and handling a heated structural member. The apparatus includes a tubular structure extending longitudinally from a first end to a second end and defining at least one passage for circulating a coolant. At least one pushrod is movably engaged with the tubular structure, and an actuator is capable of adjusting the at least one pushrod relative to the tubular structure. A controller is in remotely operable communication with the actuator such that adjustment of the controller adjusts the at least one pushrod. Further, at least one latch is rotatably connected to the tubular structure and at least one of the pushrods so that translation of each pushrod causes a respective latch to engage and disengage the structural member.

According to one aspect of the invention, a liquid coolant source is fluidly connected to the at least one passage. According to another aspect, a duct is connected to the tubular structure and configured to emit a cooling gas directed toward the structural member when the latch is engaged to the structural member.

Thus, there is provided an apparatus for handling a structural member. The apparatus is capable of lifting, moving, and manipulating structural members and does not require significant physical exertion by the operator. Also, the apparatus is capable of engaging and precisely placing a variety of different structural members so that the operator does not need to work close to the structural member or the processing device, thereby reducing the operator's exposure to heat or other dangers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
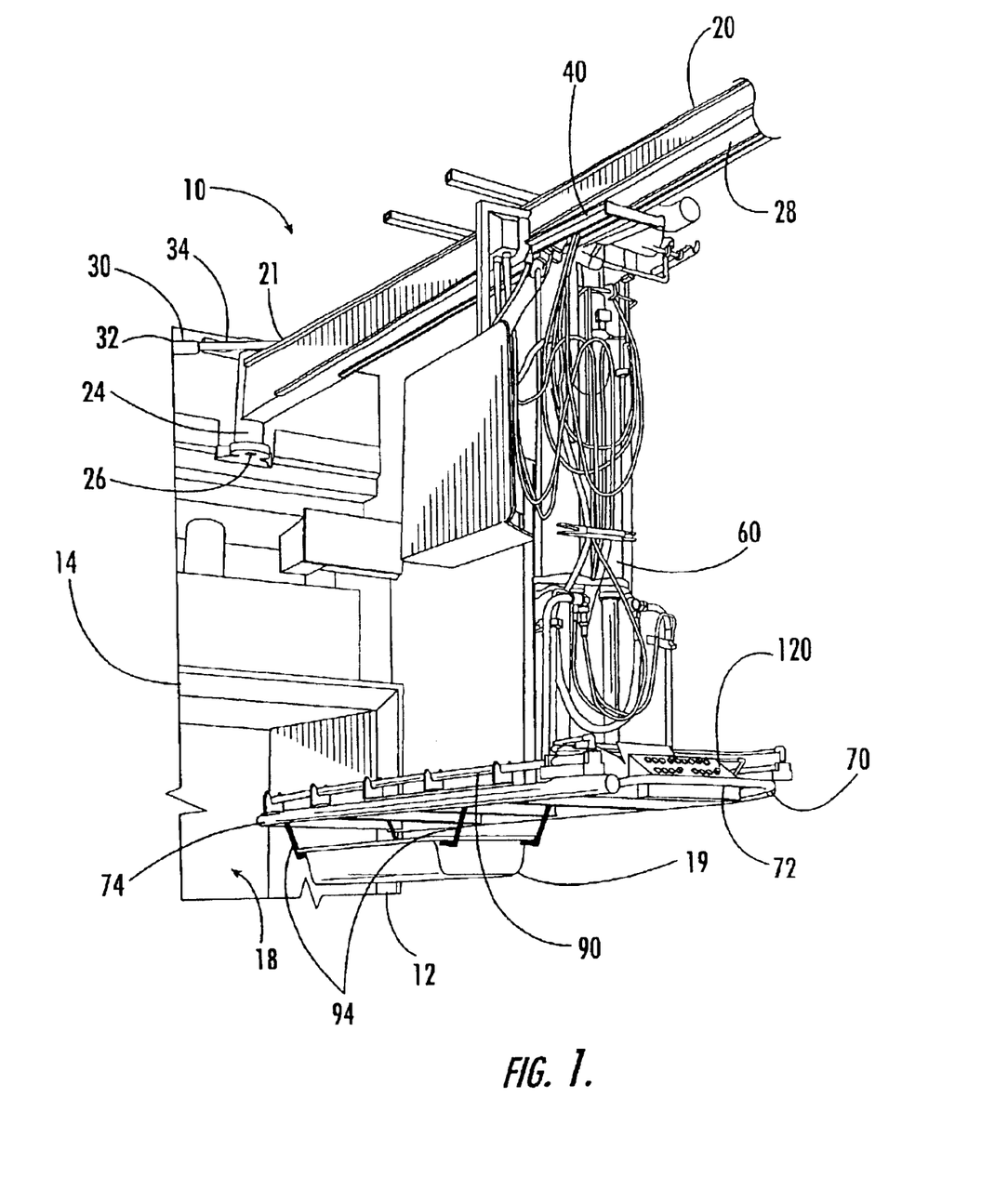
FIG. 1 shows a perspective view of a handling apparatus according to one embodiment of the present invention.

Referring now to the figures, and in particular to FIG. 1, there is shown an apparatus 10 for handling structural members 19 according to one embodiment of the present invention. The handling apparatus 10 includes a beam 20, a shuttle 40 in translational communication with the beam 20, a fork actuator 60 connected to the shuttle 40, and a fork 70 connected to the fork actuator 60 such that the fork 70 can be raised and lowered by the fork actuator 60. The fork 70 includes a connection assembly 90 for engaging the structural member 19.

Figure 5:
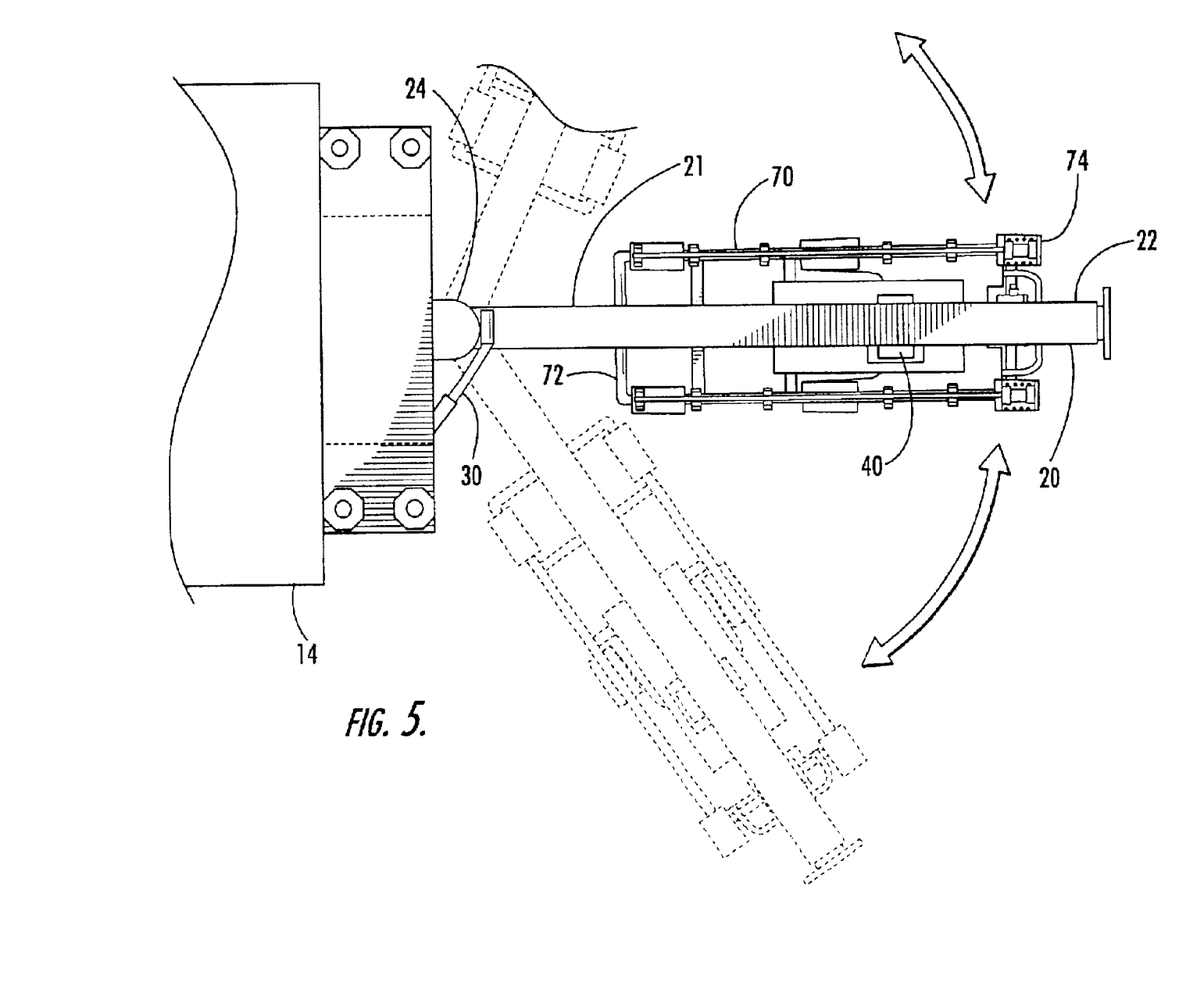
FIG. 5 shows a plan view of the handling apparatus of FIG. 1, illustrating a rotational motion of the beam.
Figure 11:
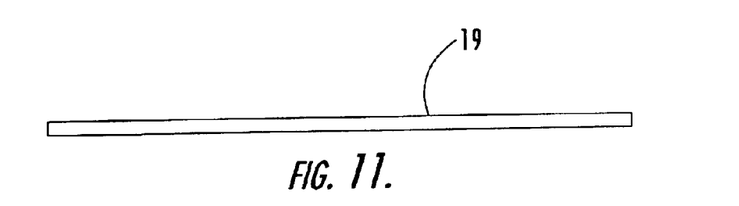
FIG. 11 shows an elevation view of a structural member before forming according to one embodiment of the present invention.
Figure 12:
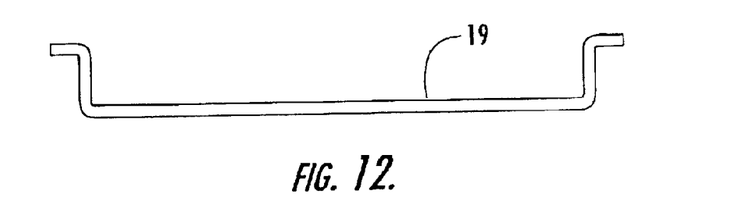
FIG. 12 shows an elevation view of a structural member after forming according to one embodiment of the present invention.

The beam 20 is connected to a base structure 12, which is proximate to a device for processing the structural member such as a superplastic forming hot press 14. The hot press 14 includes a die (not shown) that receives a structural member 19a in an unformed configuration, for example, as shown in FIG. 11, and supports the structural member 19a during processing. The die can define a shape or contour, which is imparted to the structural member 19a by the application of mechanical, hydraulic, pneumatic, or other forces to form a formed structural member 19b, as shown in FIG. 12. The die is located in a heated area 18 of the press 14, and may be removable from the press 14. The beam 20 can be fixedly attached to the base structure 12, or rotationally connected by a hinge that allows the beam 20 to rotate about a vertical axis. For example, as shown in FIG. 1, the hinge comprises a clevis 24 attached to the base structure 12 and a pin 26 that attaches a first end 21 of the beam 20 to the clevis 24. A beam actuator 30 extends between the base structure 12 and the beam 20 and rotates the beam 20. The beam actuator 30 can be any known type of actuator such as a hydraulic, pneumatic, or electric actuator, and can act directly between the beam 20 and base structure 12 or through one or more gears, chains, cables, mechanical linkages, and the like. As shown in FIG. 1, the beam actuator 30 according to one embodiment comprises a cylinder 32 and a rod 34 extending therefrom. Hydraulic fluid can be pumped into or evacuated from the cylinder 32 to extend or retract the rod 34 and thereby rotate the beam 20, as shown in FIG. 5.

Figure 2:
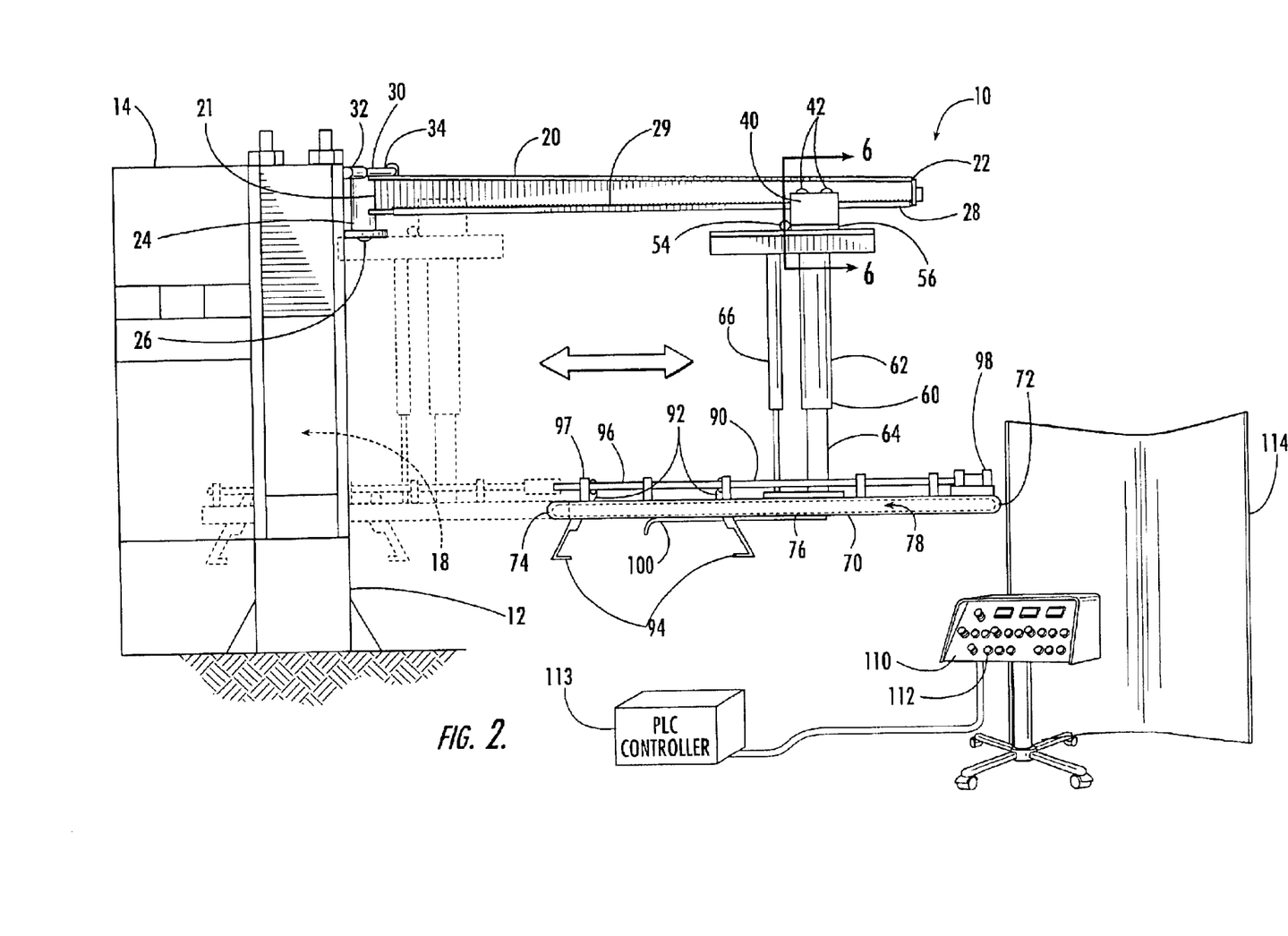
FIG. 2 shows an elevation view of the handling apparatus of FIG. 1, illustrating a motion of the shuttle.
Figure 3:
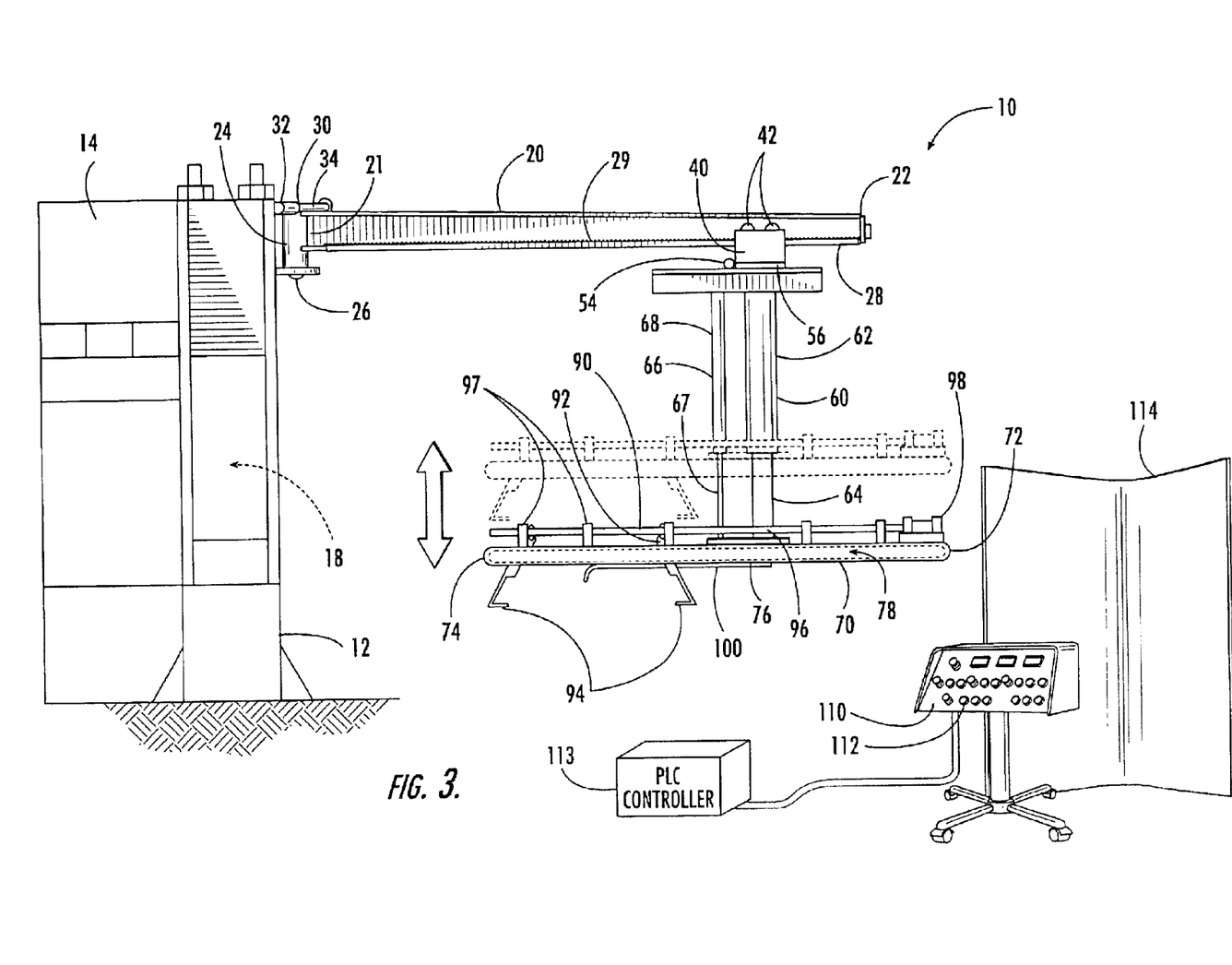
FIG. 3 shows an elevation view of the handling apparatus of FIG. 1, illustrating a motion of the fork actuator.
Figure 6:
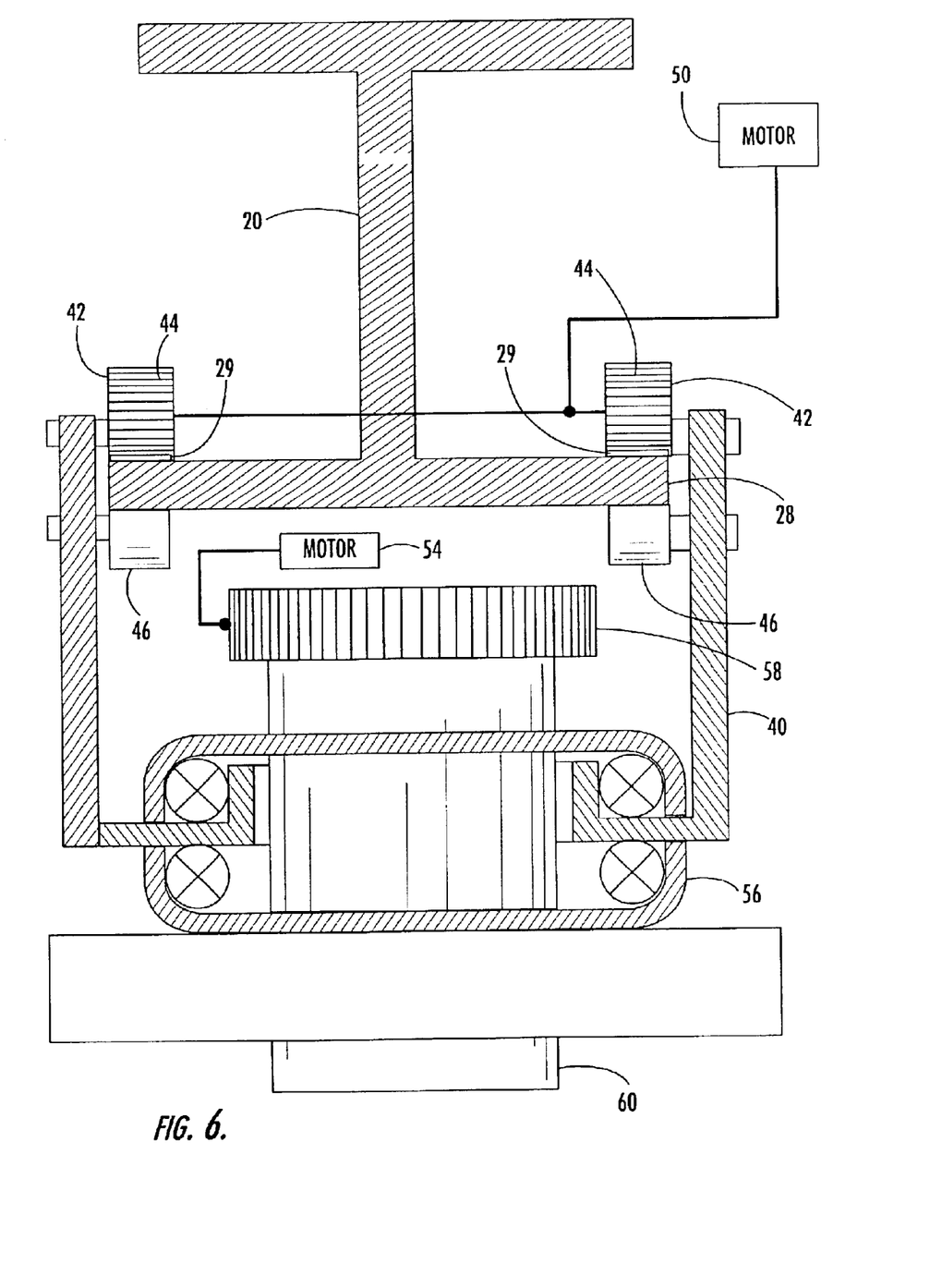
FIG. 6 shows a partial section view of the handling apparatus of FIG. 1 as seen from line 6—6 of FIG. 2.
Figure 7:
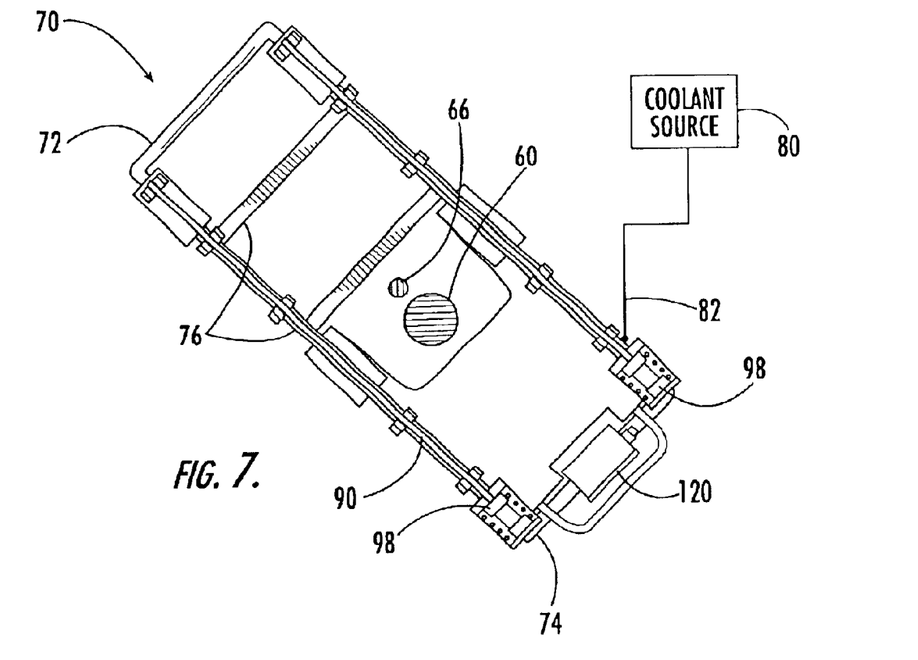
FIG. 7 shows a plan view of a fork according to one embodiment of the present invention.

In a common installation, the beam 20 extends generally horizontally from the first end 21 to a second end 22. However, the beam 20 may be oriented in a non-horizontal manner if so desired. In one embodiment, the beam 20 comprises an I-shaped beam with a flange 28 that extends in a direction of a longitudinal axis of the beam 20. The flange 28 supports the shuttle 40 such that the shuttle 40 can translate horizontally along the length of the beam 20 as shown in FIG. 2. For example, the shuttle 40 can comprise a plurality of wheels 42 that rotatably engage the flange 28 such that the shuttle 40 hangs from the beam 20 as shown in FIGS. 2, 3 and 6. Each of the wheels 42 can be a traction wheel that makes rolling contact with the flange 28. Alternatively, the wheels 42 can comprise pinion gears that define a plurality of teeth 44 and engage rack gears 29 that extend longitudinally along both sides of the flange 28. Additionally, lower wheels 46 can be provided to oppose the wheels 42 and thereby keep the wheels 42 in contact with the flange 28.

A shuttle actuator 50 is configured to advance the shuttle 40 toward the second end 22 of the beam 20 and retract the shuttle 40 toward the first end 21 of the beam 20. The shuttle actuator 50 can comprise any type of actuator known to those skilled in the art. For example, the shuttle actuator 50 shown in FIG. 6 is an electric motor that can be mounted on the shuttle 40 and connected to at least one of the wheels 42, which acts as a pinion drive to advance or retract the shuttle 40 along the rack gears 29. In other embodiments, the shuttle actuator 50 is not mounted on the shuttle 40 but instead actuates the shuttle 40 via a cable, chain, shaft, or the like.

Figure 4:
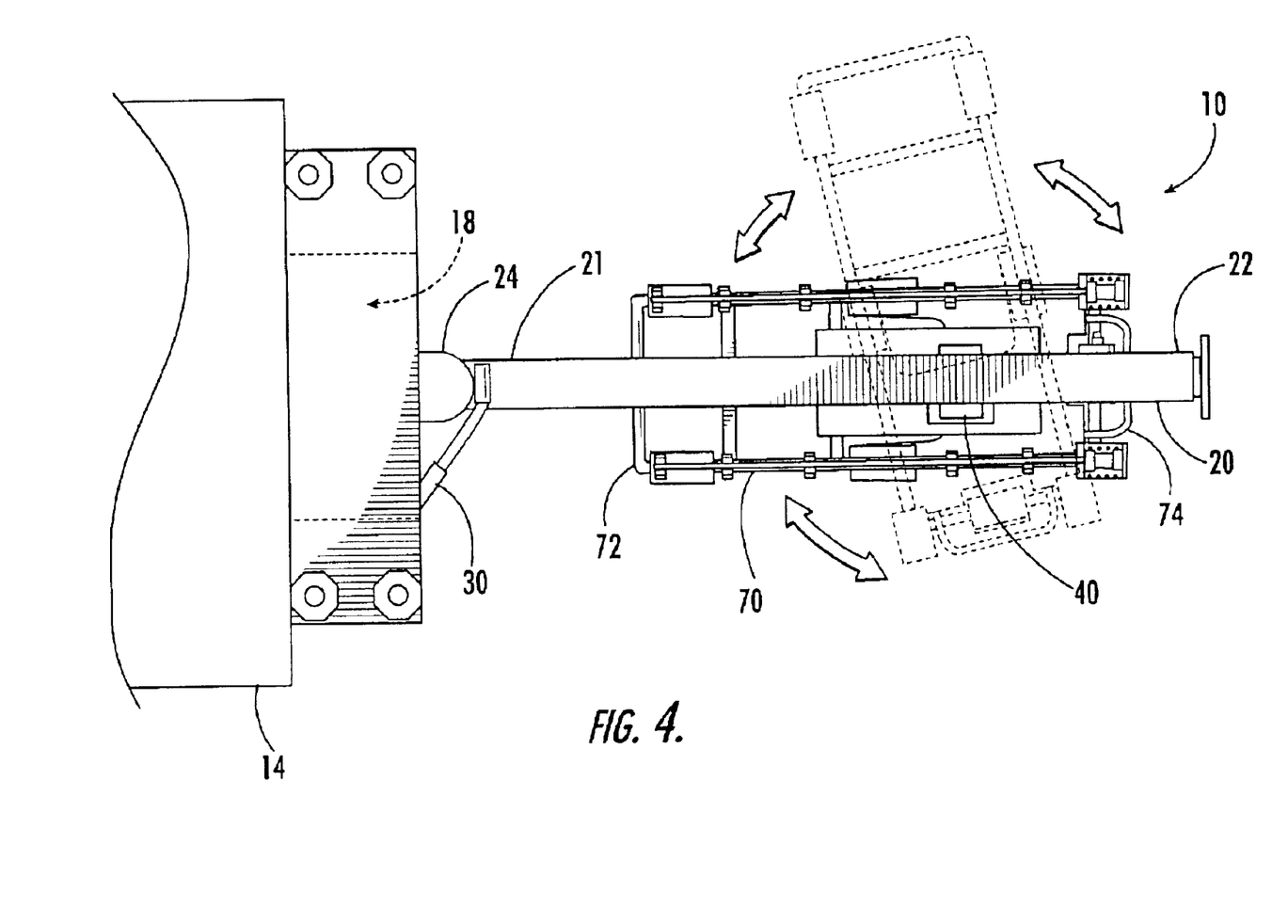
FIG. 4 shows a plan view of the handling apparatus of FIG. 1, illustrating a rotational motion of the fork.

The fork actuator 60 is supported by the shuttle 40 so that the fork actuator 60 is translated along the beam 20 as the shuttle 40 advances or retracts thereon. The fork actuator 60 is connected to the shuttle 40 via a rotational connector 56 such as a bearing plate or bushing so that the fork actuator 60 is rotatable relative to the shuttle 40 and, thus, relative to the beam 20. A rotational actuator 54 is configured to rotate the fork actuator 60 relative to the shuttle 40, as shown in FIG. 4. The rotational actuator 54 can comprise, for example, an electric motor or hydraulic actuator. In the embodiment shown in FIG. 6, the rotational actuator 54 is a variable-speed electric motor connected to the shuttle 40 and configured to rotate a gear 58 attached to the fork actuator 60.

The fork actuator 60 includes a first portion, which is connected to the shuttle 40, and a second portion, which is connected to the fork 70. In one advantageous embodiment, the fork actuator 60 is a hydraulic actuator, the first portion of which is a cylinder 62 and the second portion of which is a rod 64 extending therefrom. Hydraulic fluid can be pumped into or evacuated from the cylinder 62 to extend or retract the rod 64 and thereby lower or lift the fork 70, as shown in FIG. 3. A fork lock 66 also extends between the fork 70 and the shuttle 40 and is adjustable in length to correspond to the length of the fork actuator 60. The fork lock 66 prevents the fork 70 from rotating relative to the shuttle 40. For example, the fork lock 66 can comprise a rod 67 and a guide bushing 68. In one advantageous embodiment, the fork lock 66 is also an extension lock, which can be locked at a particular length to restrict extension of the fork 70 relative to the shuttle 40, for example, vertical adjustment of the fork relative to the shuttle 40. The fork lock 66 can be locked by inserting a pin through an aperture that extends through the rod 67 and guide bushing 68. Alternatively, clamps, electromagnets, or other devices can be used to lock the rod 67 at a particular length.

Figure 9:
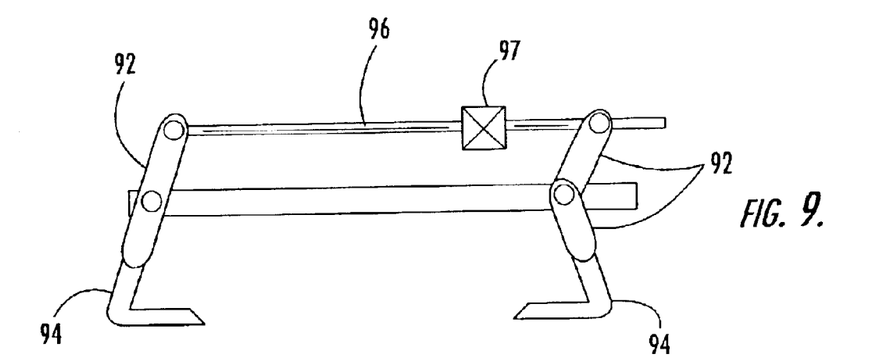
FIG. 9 shows an elevation view of the connection assembly of the fork of FIG. 7 in a disengaged position.
Figure 10:
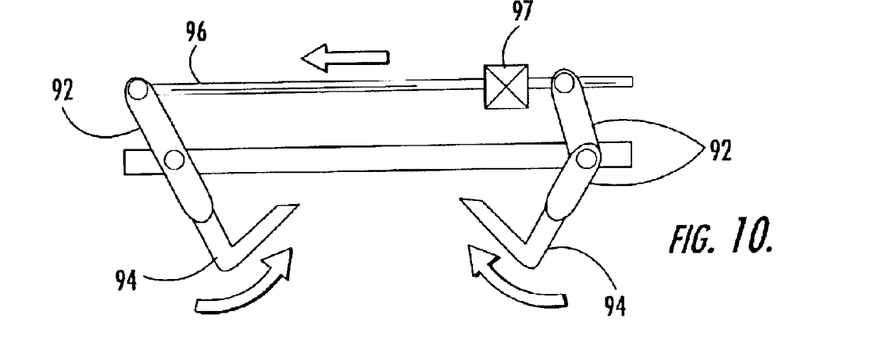
FIG. 10 shows an elevation view of the connection assembly of the fork of FIG. 7 in an engaged position.

In a common installation, the fork 70 extends generally horizontally from a first end 72 to a second end 74. However, the fork 70 may be oriented in a non-horizontal manner if so desired. The first end 72 of the fork 70 is connected to the fork actuator 60 such that the second end 74 extends outwardly from the fork actuator 60 and the second end 74 can be directed toward the hot press 14 and inserted into the heated area 18 thereof. The connection assembly 90 of the fork 70 includes a latch linkage 92 actuated by a latch actuator 98 and configured to adjust latch members 94 that engage the structural member 19. The latch linkage 92 shown in FIGS. 8–10 comprises pushrods 96 that extend from the latch actuator 98 to the latch members 94. The pushrods 96 are slidably engaged by guides 97, which preferably comprise bushings or bearings. The latch actuator 98 comprises a hydraulic, pneumatic, electric, or other actuator capable of extending and retracting the pushrods 96. The pushrods 96 can also be biased to either an extended or retracted position, for example, by springs (not shown). As the pushrods 96 are adjusted by the latch actuator 98, the pushrods adjust the latch members 94 which are rotatably connected to the fork 70. The latch members 94 can comprise, for example, hooks, latches, pins, rods, and the like. Thus, the latch members 94 can be configured to correspond to connection points on the structural member 19, and the latch members 94 can be adjusted to engage the connection points and thereby releasably grip the structural member 19. Advantageously, the latch members 94 can also be adjusted or changed to correspond to connection points of different structural members so that the handling apparatus 10 can be used for different types and sizes of structural members.

Figure 8:
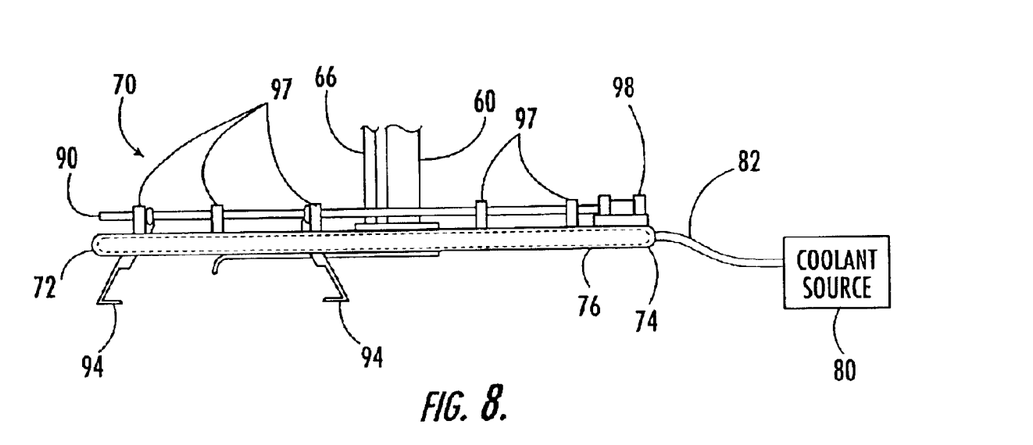
FIG. 8 shows an elevation view of the fork of FIG. 7.

In one advantageous embodiment of the invention, the fork 70 comprises a cooling system so that the temperature of the fork 70 can be maintained below a maximum temperature, even while the fork 70 is used to handle hot structural members 19 in or around a heated processing device such as the hot press 14. For example, the fork 70 can comprise tubes 76 that define at least one internal passage 78 as shown in FIG. 8. A fluid coolant such as water, glycol, oil, or the like is circulated through the passage(s) 78. The coolant is circulated from a coolant source 80, which is connected to the passage(s) 78 via coolant lines 82, which can comprise pipes or heat resistant tubes. A pump (not shown) can be used to circulate the coolant through the passage(s) 78 of the fork 70, and the coolant can be cooled in a radiator, heat exchanger, or cooling tower and recirculated through the fork 70. Preferably, the cooling system cools the fork 70 so that the fork 70 can be used to continuously handle structural members 19.

The fork 70 additionally includes a duct 100, which directs a cooling gas from a gas source (not shown) toward the structural member 19. As shown in FIG. 8, the duct 100 can include tubing connected to the fork 70 and curved downward toward the structural member 19 when the fork 70 is positioned above the structural member 19, for example, when the connection assembly 90 engages the structural member 19. The cooling gas can be used to cool the structural member 19 and to cool the air surrounding the structural member 19 to reduce the heating effect of the heated structural member 19 on the fork 70. The cooling gas can comprise ambient air or other gases as are known in the art.

As shown in FIGS. 2 and 3, a control console 110 includes a plurality of controllers 112 in operable communication with the handling apparatus 10. Each controller 112 can comprise a button, switch, lever, joystick controller, or other controller device. The controllers 112 can also be connected to a programmable logic controller (PLC) 113, which in turn controls, for example, each of the beam actuator 30, the shuttle actuator 50, the rotational actuator 54, the fork actuator 60, and the latch actuator 98. Additionally, the controllers 112 and/or the PLC 113 can be used to adjust the flow rate, temperature, or other characteristics of the circulation of coolant through the tubes 76 of the cooling system and the flow of cooling gas emitted through the duct 100.

In one advantageous embodiment of the invention, the controllers 112 are in remote operable communication with the handling apparatus 10. The controllers 112 can remotely communicate with the handling apparatus 10 via an electrical connection, for example, by electrical wires that extend between the controllers 112 and the actuators 30, 50, 54, 60, 98. Other forms of remote operable communication include communication by radio or optical signals. The control console 110 can be located close enough to the handling apparatus 10 to allow the operator to visually observe the handling apparatus 10 but far enough from the handling apparatus 10 and the hot press 14 that the operator does not need to wear thermally protective clothing. A heat screen 114 can also be positioned between the control console 110 and the hot press 14. Additionally, the control console 110 can be located independently of the fork 70 so that the control console 110 can be stationary, even while the fork 70 is moving. An auxiliary control console 120 can also be provided, for example on the fork 70, as shown in FIG. 1.

During operation, the operator can use the handling apparatus 10, for example, to lift the structural member 19 from a location proximate to the hot press 14, place the structural member 19 in the die of the hot press 14, and remove the structural member 19 from the hot press 14 after processing therein. Preferably, the operator controls the handling apparatus 10 using the controllers 112 on the control console 110 and does not need to touch the structural member 19 or the fork 70. Instead, the operator adjusts the controllers 112 that correspond to the latch actuator 98 to rotate the latch members 94 to a retracted, or disengaged, position. Similarly, the operator also adjusts one or more of the actuators 30, 50, 54, 60 to position the fork 70 directly above the structural member 19. The operator then engages the fork 70 to the structural member 19 by using one or more of the controllers 112 to adjust the latch actuator and, thus, the latch members 94 to an engaged position, thereby engaging the fork 70 to the structural member 19. The operator uses the controllers 112 to move the fork 70 to a position proximate to the die such that the structural member 19 is placed in the die. For example, the fork actuator 60 can be used to lift the structural member 19, and the beam actuator 30 can be used to rotate the beam 20 so that the beam 20 is aligned with the die. The operator then controls the shuttle actuator 50 and the rotational actuator 54 to translate and rotate the structural member 19 to a position above the die. The operator can then lower the structural member 19 into the die by using the fork actuator 60 to extend the fork 70. The operator then releases the structural member 19 from the fork 70 by controlling the latch actuator 98 to rotate the latch members 94 back to the retracted position. After the structural member 19 has been processed, the operator engages the fork 70 similarly and removes the structural member 19 from the die.

Preferably, the actuators 30, 50, 54, 60, 98 are capable of such precise movement of the fork 70 that the structural member 19 can be positioned within the press 14 without manual assistance from the operator for aligning the structural member 19 with the die. For example, the fork actuator 60 is hydraulically actuated and capable of moving the structural member 19 both up and down smoothly and at a variable speed to so that the operator can carefully align the structural member 19 with the die. The other actuators can similarly be speed variable. For example, the shuttle actuator 50, which can comprise an electric motor, can comprise a variable speed electric motor so that the speed at which the shuttle 40 is extended or retracted along the beam 20 can be adjusted. Additionally, all the actuators 30, 50, 54, 60, 98 can be capable of resisting motion so that the handling apparatus 10 and, thus, the structural member 19 can be locked in place, thereby preventing inadvertent movement of the handling apparatus 10 or the structural member 19. The actuators 30, 50, 54, 60, 98 can include any known locking devices, such as mechanical or electrical lockout mechanisms.

The handling apparatus 10 can be used to lift, move, and otherwise manipulate the structural member 19. Thus, the handling apparatus 10 allows the operator to avoid manual exertion that would otherwise be required for these tasks. Additionally, the handling apparatus 10 allows the operator to avoid contact with the structural member 19 and exposure to the environment near the structural member 19, thereby reducing the operator's exposure to heat and/or other dangers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for handling a structural member, comprising:
    a beam extending from a first end to a second end;
    a shuttle in translational communication with said beam in a direction extending between said first and second ends;
    a fork actuator connected to said shuttle, said fork actuator having a first portion and a second portion and capable of hydraulically raising and lowering said second portion;
    a fork connected to said second portion of said fork actuator, wherein said fork includes a cooling system; and
    an extension lock for engaging said fork to said first portion of said fork actuator and preventing extension of said fork.

2. The apparatus of claim 1 wherein said beam is rotatable about a vertical axis.

3. The apparatus of claim 2 wherein said beam is cantilevered from a hinge.

4. The apparatus of claim 2 further comprising a beam actuator in communication with said beam and configured to rotate said beam about the vertical axis.

5. The apparatus of claim 1 further comprising a plurality of wheels rotatably connected to said shuttle and in rolling contact with said beam such that said shuttle is translatably engaged to said beam and said shuttle is capable of being translated along at least a part of said beam.

6. The apparatus of claim 5 wherein said beam defines a rack gear extending between said first and second ends of said beam and wherein each wheel defines teeth that engage the rack gear.

7. The apparatus of claim 1 further comprising a shuttle actuator configured to translate said shuttle along said beam.

8. The apparatus of claim 1 further comprising a rotational actuator in rotational communication with said fork actuator and capable of rotating said fork actuator relative to said beam.

9. The apparatus of claim 8 wherein said rotational actuator is a variable speed electric motor.

10. The apparatus of claim 1 wherein said fork defines a first end connected to said fork actuator and a second end extending outwardly from said fork actuator such that said second end is capable of extending outwardly into a heating chamber to engage the structural member.

11. The apparatus of claim 1 wherein said fork comprises a latch linkage, a latch actuator capable of adjusting said latch linkage, and at least one latch member, said latch linkage being adjustable to releasably engage said at least one latch member with the structural member.

12. The apparatus of claim 11 wherein said latch linkage comprises at least one pushrod slidably engaged with said fork and each latch member comprises a latch, each latch being rotarably connected to said fork and at least one of said pushrods such that translation of each said pushrod causes a respective latch to engage and disengage the structural member.

13. The apparatus of claim 1 wherein said fork defines at least one passage for circulating a coolant.

14. The apparatus of claim 13 wherein said at least one passage extends between said first and second ends of said fork.

15. The apparatus of claim 13 further comprising a coolant source fluidly connected to said at least one passage.

16. The apparatus of claim 1 further comprising a duct connected to said fork and configured to emit a cooling fluid directed toward the structural member when said fork is engaged to the structural member.

17. An apparatus for handling a structural member, comprising:
a beam extending from a first end to a second end and rotatable about an axis;
a shuttle in translational communication with said beam in a direction extending between said first and second ends;
a fork actuator connected to said shuttle, said fork actuator having a first portion and a second portion and capable of hydraulically raising and lowering said second portion;
a fork connected to said second portion of said fork actuator;
a rotational actuator in rotational communication with said fork actuator and capable of rotating said fork relative to said beam; and
an extension lock for engaging said fork to said first portion of said fork actuator and preventing vertical adjustment of said fork.

18. The apparatus of claim 17 wherein said beam is cantilevered from a hinge.

19. The apparatus of claim 17 further comprising a beam actuator in communication with said beam and configured to hydraulically rotate said beam about a vertical axis.

20. The apparatus of claim 19 further comprising a plurality of wheels rotatably connected to said shuttle and in rolling contact with said beam such that said shuttle is translatably engaged to said beam and said shuttle is capable of being translated along at least a part of said beam.

21. The apparatus of claim 20 wherein said beam defines a rack gear extending between said first and second ends of said beam and wherein said wheels define teeth that engage the rack gear.

22. The apparatus of claim 17 further comprising a shuttle actuator configured to translate said shuttle along said beam.

23. The apparatus of claim 17 wherein the rotational actuator is capable of rotating said fork actuator relative to said beam.

24. The apparatus of claim 17 wherein said rotational actuator is a variable speed electric motor.

25. The apparatus of claim 17 wherein said fork defines a first end connected to said fork actuator and a second end extending outwardly from said fork actuator such that said second end is capable of extending outwardly into a heating chamber to engage the structural member.

26. The apparatus of claim 17 wherein said fork comprises a latch linkage, a latch actuator capable of adjusting said latch linkage, and at least one latch member, said latch linkage being adjustable to releasably engage said at least one latch member with the structural member.

27. The apparatus of claim 26 wherein said latch linkage comprises at least one pushrod slidably engaged with said fork and each latch member comprises a latch, each latch being rotatably connected to said fork and at least one of said pushrods such that translation of each said pushrod causes a respective latch to engage and disengage the structural member.

28. The apparatus of claim 17, further comprising a duct connected to said fork and configured to emit a cooling fluid directed toward the structural member when said fork is engaged to the structural member.

29. An apparatus for releasably engaging and handling a heated structural member, comprising:
a tubular structure extending longitudinally from a first end to a second end, wherein said tubular structure defines at least one passage for circulating a coolant;
at least one pushrod movably engaged with said tubular structure;
an actuator capable of adjusting said at least one pushrod relative to said tubular structure;
a controller in remote operable communication with said actuator such that adjustment of said controller adjusts said at least one pushrod; and
at least one latch rotatably connected to said tubular structure and at least one of said pushrods such that translation of each pushrod causes a respective latch to engage and disengage the structural member.

30. The apparatus of claim 29 further comprising a liquid coolant source fluidly connected to said at least one passage.

31. The apparatus of claim 29 further comprising a duct connected to said tubular structure and configured to emit a cooling gas directed toward the structural member when said latch is engaged to the structural member.

* * * * *